Apr. 10, 1923.
W. N. BLANCHARD
VALVE
Filed Jan. 8, 1921
Fig.1.
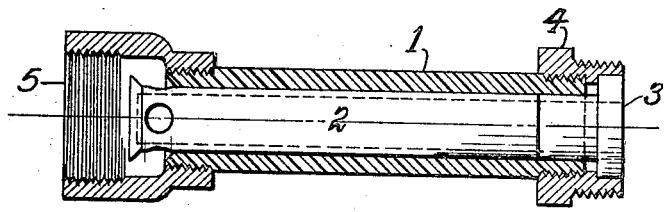
Fig.2.
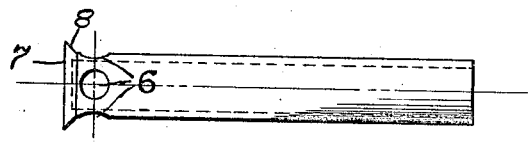
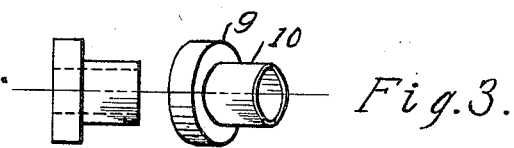
Fig.3.
WITNESSES
Edward F. Mason.
Ed. L. Puez.
Inventor,
William N. Blanchard.

Patented Apr. 10, 1923.                                                              1,451,037

UNITED STATES PATENT OFFICE.

WILLIAM N. BLANCHARD, OF EAST ST. LOUIS, ILLINOIS.

VALVE.

Application filed January 8, 1921. Serial No. 436,003.

*To all whom it may concern:*

Be it known that I, WILLIAM N. BLANCHARD, a citizen of the United States, residing at East St. Louis, in the county of St. Clair and State of Illinois, have invented a new and useful Improvement in Valves, of which the following is a specification.

My invention is an improvement in valves and has for its object to provide a valve for use with pneumatic tools in general, wherein the principal portions of the mechanism are arranged within the members connecting the air-hose with the pneumatic tool, which consists of a pipe-nipple and a pipe-reducing-bushing, and means is provided in the said mechanism for opening the said valve by inserting the said pipe-nipple into the said pipe-reducing-bushing, and for closing the said valve by the air pressure against the closed end of the valve when disconnected.

In the drawings: Fig. 1 is a sectional view of the valve engaged for service. Fig. 2 is a side view of the one-piece valve and hollow tubular valve-stem. Fig. 3 is a perspective view and a side view of the valve-stop-bushing. The present embodiment of the invention is shown in Fig. 1 wherein member 1 is made from a standard pipe nipple by reaming its inner surface to a smooth sliding surface and countersinking either end at a convenient angle to serve as a seat for the said valve.

Member 2 is the valve and tubular valve-stem combined, which is made from a brass tube with one end closed and headed by swedging or upsetting; the head being flared to the same degree of taper as the counter-sunken end of member 1 to permit an air tight connection between the valve and the valve-seat. Holes are arranged in the valve-stem near the upset end, to allow the air to pass through the hollow valve stem, when the valve is opened. Member 3 also shown in Fig. 3 is a brass bushing with a shoulder 9 (of Fig. 3) to be pressed into the counter bore of member 4 (of Fig. 1). Member 4 is a pipe reducing bushing counter-bored at the male end to permit the shoulder 9 (of Fig. 3) to be pressed into said reducing-bushing member 4. The small end 10 (of Fig. 3) of member 3 acts as a stop against the open end of the said valve-stem and causes the valve to open while making the connection between members 1 and 4. When disconnected the air-pressure against the closed end of the inner tube causing the valve to close.

I claim:—

A valve comprising a valve-casing consisting of a pipe nipple reamed on its inner surface and countersunk at one end to form a valve-seat, said casing being threaded at each end and provided with coupling members, a valve slidably mounted within said casing comprising an upset closed head and an integral valve stem, said valve stem being provided with a longitudinal bore throughout its greater length and terminating in a lateral bore, means for opening said valve comprising a brass nipple insertable in said valve casing and an external coupling member for operating said brass nipple to open the valve when the coupling is made.

WILLIAM N. BLANCHARD.

Witnesses:
 ELMER B. VOSS,
 EDWARD C. PIRETZ.